US012705077B2

(12) United States Patent
Liu et al.

(10) Patent No.: US 12,705,077 B2
(45) Date of Patent: Aug. 11, 2026

(54) GENERATION OF VIRTUALIZED SHARED TAB FOR SCREEN SHARING

(71) Applicant: International Business Machines Corporation, Armonk, NY (US)

(72) Inventors: Su Liu, Austin, TX (US); Luis Osvaldo Pizana, Austin, TX (US); Jun Su, Beijing (CN); Jeremy R. Fox, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 297 days.

(21) Appl. No.: 17/942,983

(22) Filed: Sep. 12, 2022

(65) Prior Publication Data

US 2024/0086211 A1 Mar. 14, 2024

(51) Int. Cl.
*G06F 3/04842* (2022.01)
*G06F 9/451* (2018.01)

(52) U.S. Cl.
CPC .......... *G06F 9/452* (2018.02); *G06F 3/04842* (2013.01)

(58) Field of Classification Search
CPC ............................. G06F 9/452; G06F 3/04842
See application file for complete search history.

(56) References Cited

U.S. PATENT DOCUMENTS 5,933,597 A 8/1999 Hogan
6,570,590 B1 5/2003 Dubrow et al.
7,203,755 B2 4/2007 Zhu et al.
8,185,828 B2 5/2012 Liu et al.
10,581,939 B2 3/2020 Ingale et al.
10,887,354 B2 1/2021 Prabhu et al.
2006/0031779 A1 2/2006 Theurer et al.
2010/0131868 A1 5/2010 Chawla et al.
2016/0147400 A1* 5/2016 Patten ..................... G06F 3/147 715/753
2017/0024100 A1* 1/2017 Pieper ................. H04L 12/1827
2019/0166330 A1* 5/2019 Ma ......................... H04L 65/403
2021/0099488 A1 4/2021 Schrager et al.
2021/0349604 A1 11/2021 Van Wie et al.
2022/0244902 A1* 8/2022 Dusad ................... G06F 3/0486
2022/0382568 A1* 12/2022 Dhar ................... G06F 9/45558

FOREIGN PATENT DOCUMENTS

EP 1159803 B1 5/2012
JP 6240594 B2 11/2017

OTHER PUBLICATIONS

Dubroy, "How many tabs do people use? Now with real Data", Apr. 13, 2009, 12pp. [online][retrieved Jun. 24, 2022] https://dubroy.com/blog/how-many-tabs-do-people-use-now-with-real-data/.
"Global Web Conferencing Market Insights and Forecase to 2028", aluates Reports, Jan. 2022, 4pp. [online] [retrieved on Jun. 24, 2022] https://reports.valuates.com/market-reports/QYRE-Auto-24L2147/globa . . . .

* cited by examiner

*Primary Examiner* — Mahelet Shiberou

(57) ABSTRACT

A request to share an object is received within a virtualized screen sharing management application. A virtualized display for sharing the object is generated. The object is mapped to the virtualized display. Responsive to the request, the object is shared within the virtualized screen sharing management application via the virtualized display.

18 Claims, 7 Drawing Sheets

FIG. 7

GENERATION OF VIRTUALIZED SHARED TAB FOR SCREEN SHARING

BACKGROUND

1. Field

Embodiments relate to the generation of virtualized shared tab for screen sharing.

2. Background

Screen sharing or desktop sharing is a common name for technologies and products that allow a user to share a computer screen for remote access and remote collaboration on a computer desktop through a graphical terminal emulator. Two common scenarios for desktop sharing comprise remote login and real-time collaboration.

Real-time collaboration is a significant area of screen sharing use and has gained momentum as an important component of rich multimedia communications. Screen sharing, when used in conjunction with other components of multimedia communications, such as, audio and video, allows people to meet and work together virtually over a network of computers. On a larger scale, this area is also referred as web conferencing.

SUMMARY OF THE PREFERRED EMBODIMENTS

Provided are a method, system, and computer program product in which a request to share an object is received within a virtualized screen sharing management application. A virtualized display for sharing the object is generated. The object is mapped to the virtualized display. Responsive to the request, the object is shared within the virtualized screen sharing management application via the virtualized display.

In additional embodiments, the object is a first object. A sequence of operations are defined for handling objects that are selected to be shared within the virtualized screen sharing management application, based on observed events. Events are monitored within the virtualized screen sharing management application. A second object is rendered for display on the virtualized display according to the sequence of operations, in response to observing a first event.

In yet additional embodiments, the object is a first object displayed on a first display monitor, wherein a second object is displayed on a second display monitor, and wherein the virtualized display is a first virtualized display. The first object displayed on the first display monitor and the second object displayed on the second display monitor are mapped to a second virtualized display. The first object displayed on the first display monitor and the second object displayed on the second display monitor are shared within the virtualized screen sharing management application via the second virtualized display.

In further embodiments, a plurality of objects displayed on a plurality of monitors are mapped to the virtualized display.

In certain embodiments, the object comprises a browser or application tab.

In further embodiments, the object comprises an application.

In yet further embodiments, the virtualized display is generated on a local computational device, wherein the object is shared with a remote computational device via the virtualized display.

BRIEF DESCRIPTION OF THE DRAWINGS

Referring now to the drawings in which like reference numbers represent corresponding parts throughout:

Figure 7:
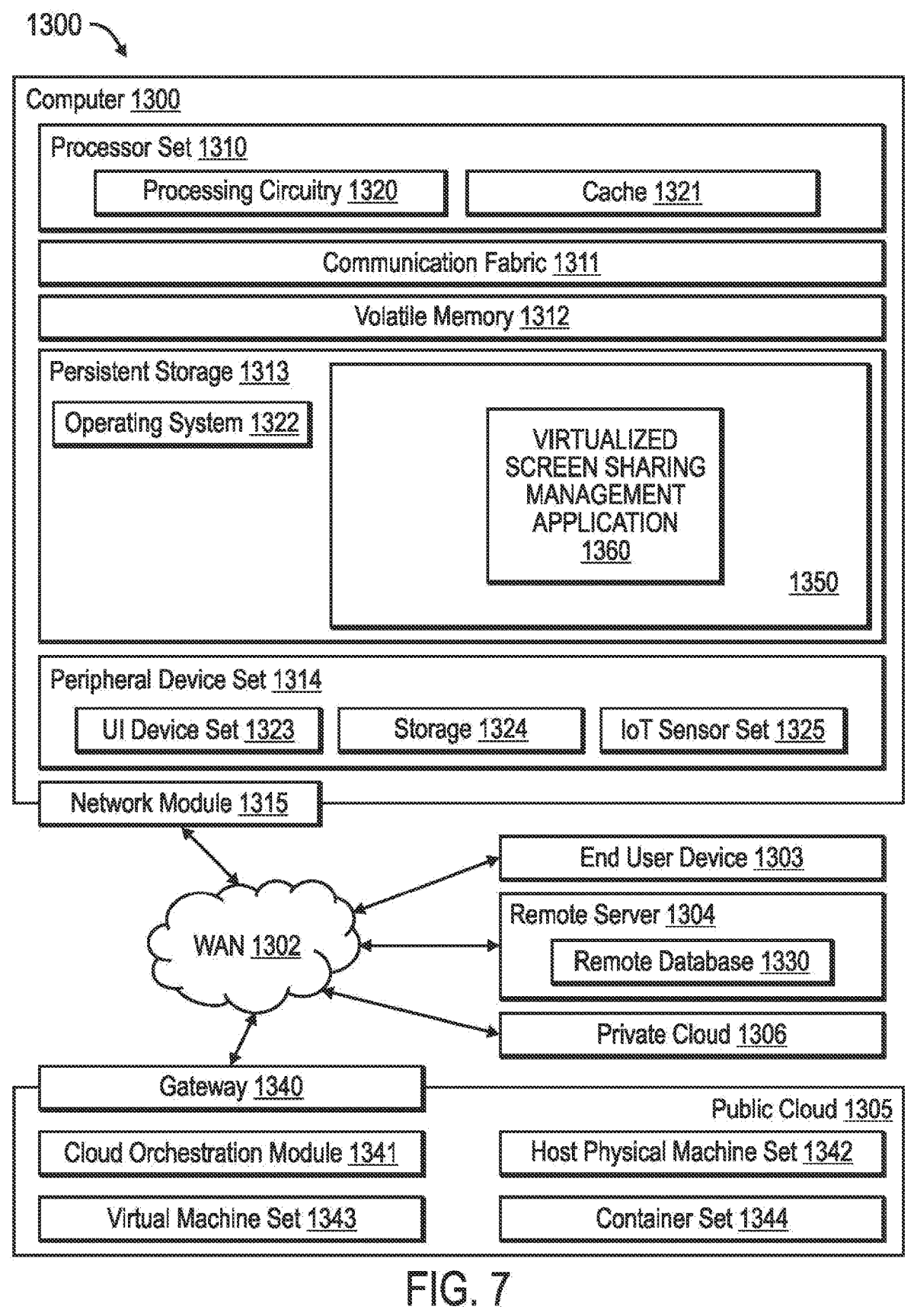

FIG. 7 illustrates a computing environment in which the components of FIG. 1 may be implemented, in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made.

Display sharing is one of the most important features in web conference, teamwork, remote work, etc. Virtual conferencing over the Web is a widely used technology and is expanding rapidly in scope. It has been found that many users may open a plurality of tabs (e.g., as many as 10 or even more) on a screen while using a computer. However, the users may not want to share all the tabs during a web conference with other users on remote computers.

Current screen sharing selection is static. A user may only share a certain pre-selected display or an application in a web conference. There is no mechanism to intelligently define, select, and render certain tabs in a shared web browser. Furthermore, there is no mechanism to intelligently define, select, and render certain applications in a shared display. Additionally, there is no mechanism to intelligently share certain tabs and applications in multiple displays.

Such limitations may cause problems for users. Users may accidentally expose a private tab in a shared application. As a result, users may have to manually close the private tabs before sharing an application. Additionally, users may have to manually close private applications before sharing a display.

Certain embodiments provide mechanisms for creating a virtual display for sharing tabs and applications. Such embodiments allow a user to intelligently define, select and render wanted tabs and applications and customize the selections. The embodiments may also allow tabs of a selected application to be hidden for sharing. Certain embodiments may map selected applications from a plurality of different local displays to a single virtual display that may be transmitted to a remote computer during web conferencing. The selection levels may be at a tab level, an application level or at a display level for a user, while generating the single virtual display. As a result, improvements are made to the operations of a computational device that is used for web conferencing.

EXEMPLARY EMBODIMENTS

Figure 1:
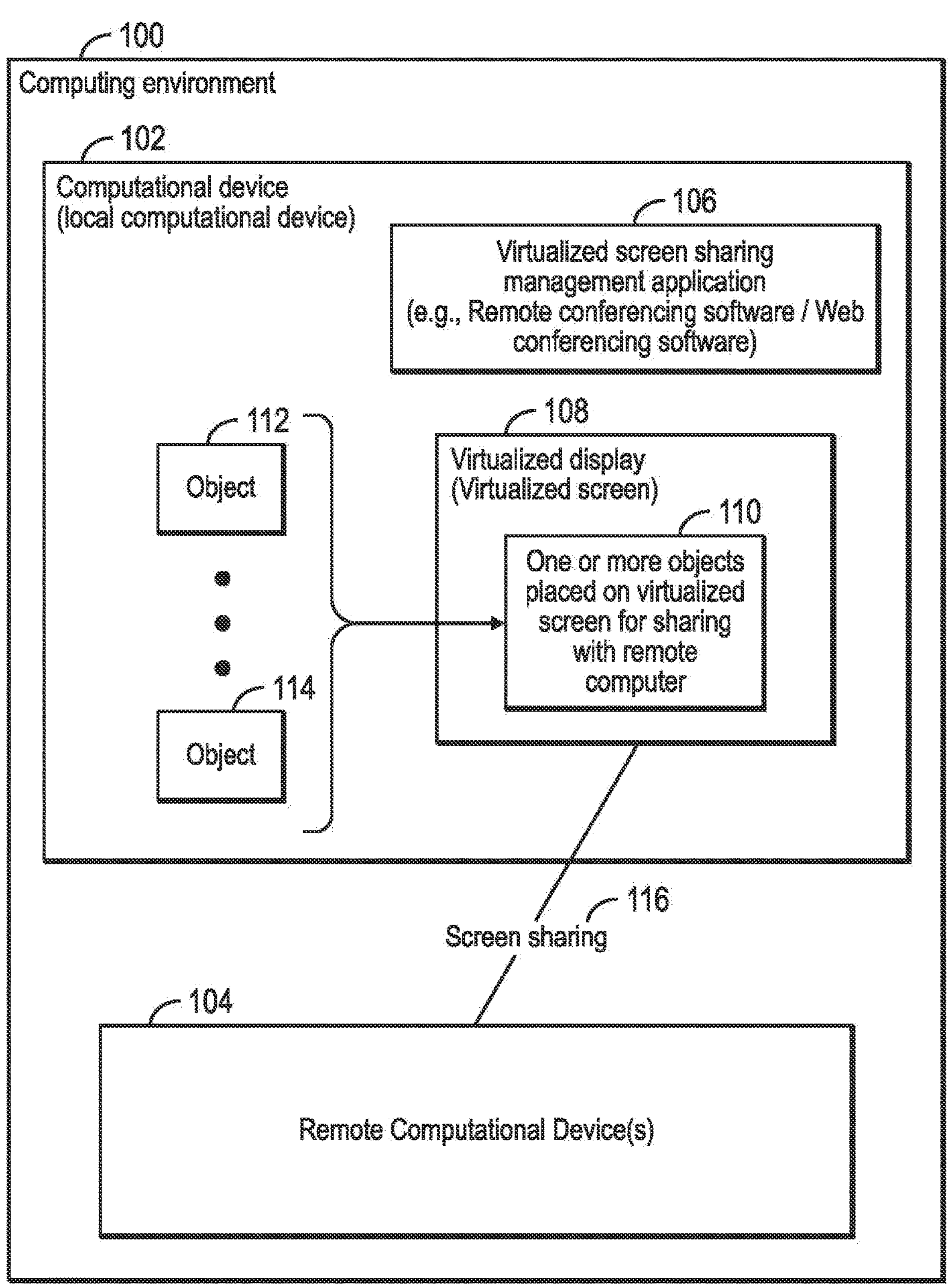
FIG. 1 illustrates a block diagram of a computing environment comprising a local computational device executing a virtualized screen sharing management application, where the local computational device is coupled to one or more remote computational devices, in accordance with certain embodiments.

FIG. 1 illustrates a block diagram of a computing environment 100 comprising a local computational device 102 coupled to one or more remote computational devices 104, in accordance with certain embodiments.

In certain embodiments, the local computational device 102 and the remote computational device 104 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The local computational device 102 and the remote computational devices 104 may be elements in any suitable network, such as, a storage area network, a wide area network, the Internet, an intranet, etc. In certain embodiments, local computational device 102 and the remote computational devices 104 may be elements in a cloud computing environment.

A virtualized screen sharing management application 106 executes in the local computational device 102. In certain embodiments, the virtualized screen sharing management application 106 may be implemented in software, hardware, firmware or any combination thereof, and may also be referred to as a remote conferencing software or a web conferencing software.

The virtualized screen sharing management application 106 may generate a virtualized display 108 on a display monitor coupled to, integrated with, or controlled by the computational device 102. The virtualized display 108 is populated with one or more objects 110 selected from a plurality of objects 112, 114 displayed on one or more computer monitors or windows controlled by one or more computational devices. The virtualized display 108 may also be referred to as a virtualized screen.

It should be noted that the one or more objects 110 included in the virtualized display 108 may be selected by a user who wants to share the one or more objects 110 via screen sharing (reference numeral 116) with one or more users of the remote computational devices 104.

In certain embodiments the objects 112, 114 may include tabs, applications, and other entities that are displayed on display monitors and screens associated with the computational device 102. A user may not want to share all of the objects 112, 114 and may select only a limited number of objects to be placed on the virtualized display 108 for sharing with the remote computational device 104.

Therefore, FIG. 1 illustrates certain embodiments in which a virtualized display 108 is generated on a local computational device 102, where the virtualized display 108 includes objects that may comprise a plurality of selected applications and selected tabs. The plurality of selected applications and selected tabs are shared with a remote computational device 104 via the virtualized display 108.

Figure 2:
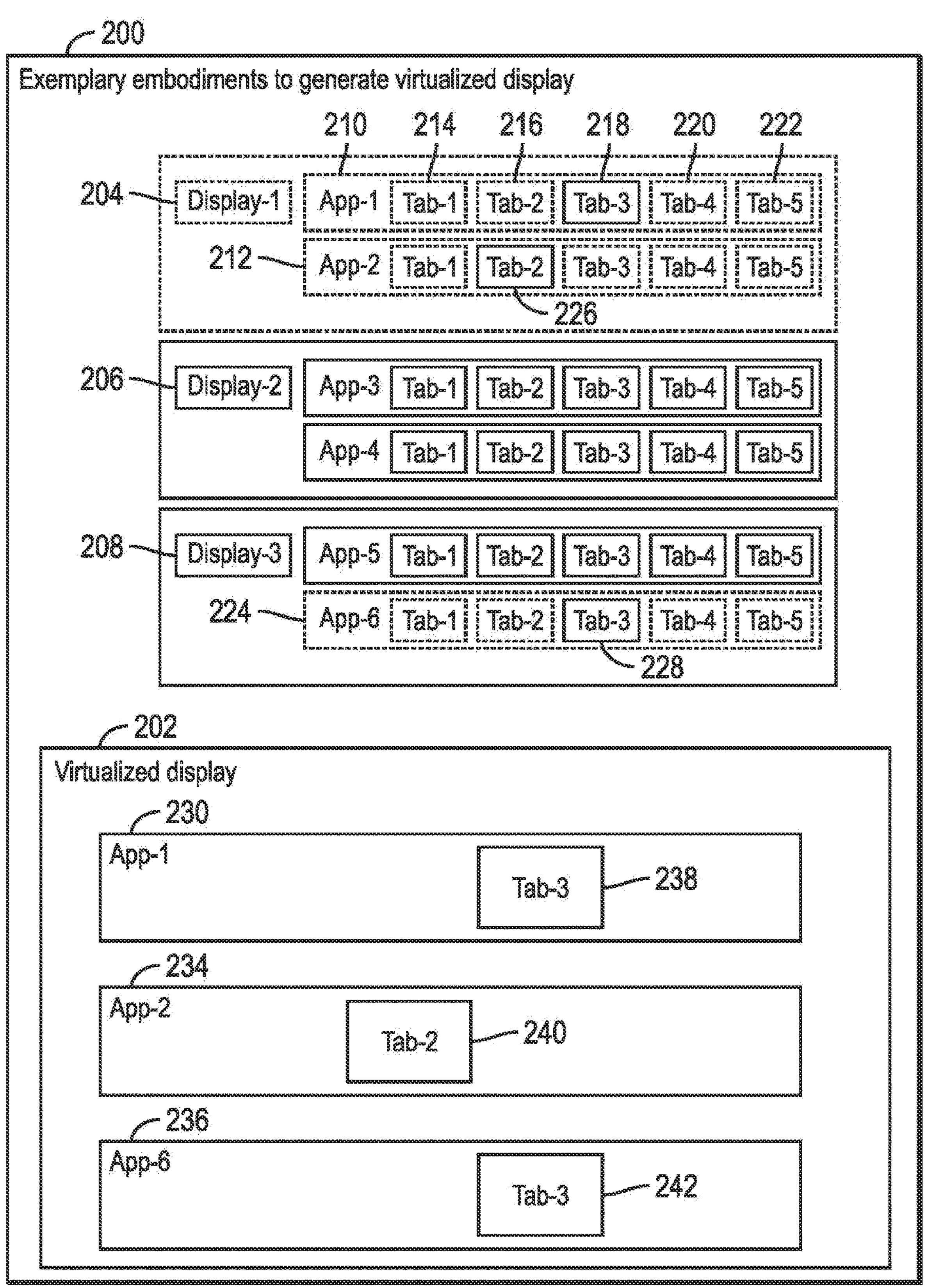
FIG. 2 illustrates a block diagram that shows how a virtualized display is generated from a plurality of displays at a local site, in accordance with certain embodiments.

FIG. 2 illustrates a block diagram 200 that shows how a virtualized display 202 is generated from a plurality of displays at a local site, in accordance with certain embodiments.

There are three displays controlled by the computational device 102, where the displays are labeled Display-1 204, Display-2 206, and Display-3 208. Each of the displays 204, 206, 208 may be a different computer monitor controlled by the computational device 102.

Each of the displays 204, 206, 208 have one or more applications running on them, where the user interface for each application has one or more tabs. For example, the user interface of two applications 210, 212 are shown on display Display-1 204, where the user interface for application App-1 210 has 5 tabs shown via reference numerals 214, 216, 218, 220, 222.

A user may determine that three applications App-1 210, App-2 212, and App-6 224 are to be shared out of the six applications on the three displays 204, 206, 208. However, the user may select only one tab from each of the three applications for sharing, where the tabs to be shared are shown via reference numeral 218, 226, 228.

The virtualized display 202 is made to include the applications and tabs that the user selects for sharing, and the shared applications and tabs are shown via reference numerals 230, 234, 236, 238, 240, 242 in the virtualized display 202 and these correspond to the applications and tabs 210, 212, 224, 218, 226, 228 respectively.

Therefore, the user is able to select specific applications and specific tabs from within the specific applications, for sharing with the remote computational device 104 via the virtualized display 202.

Figure 3:
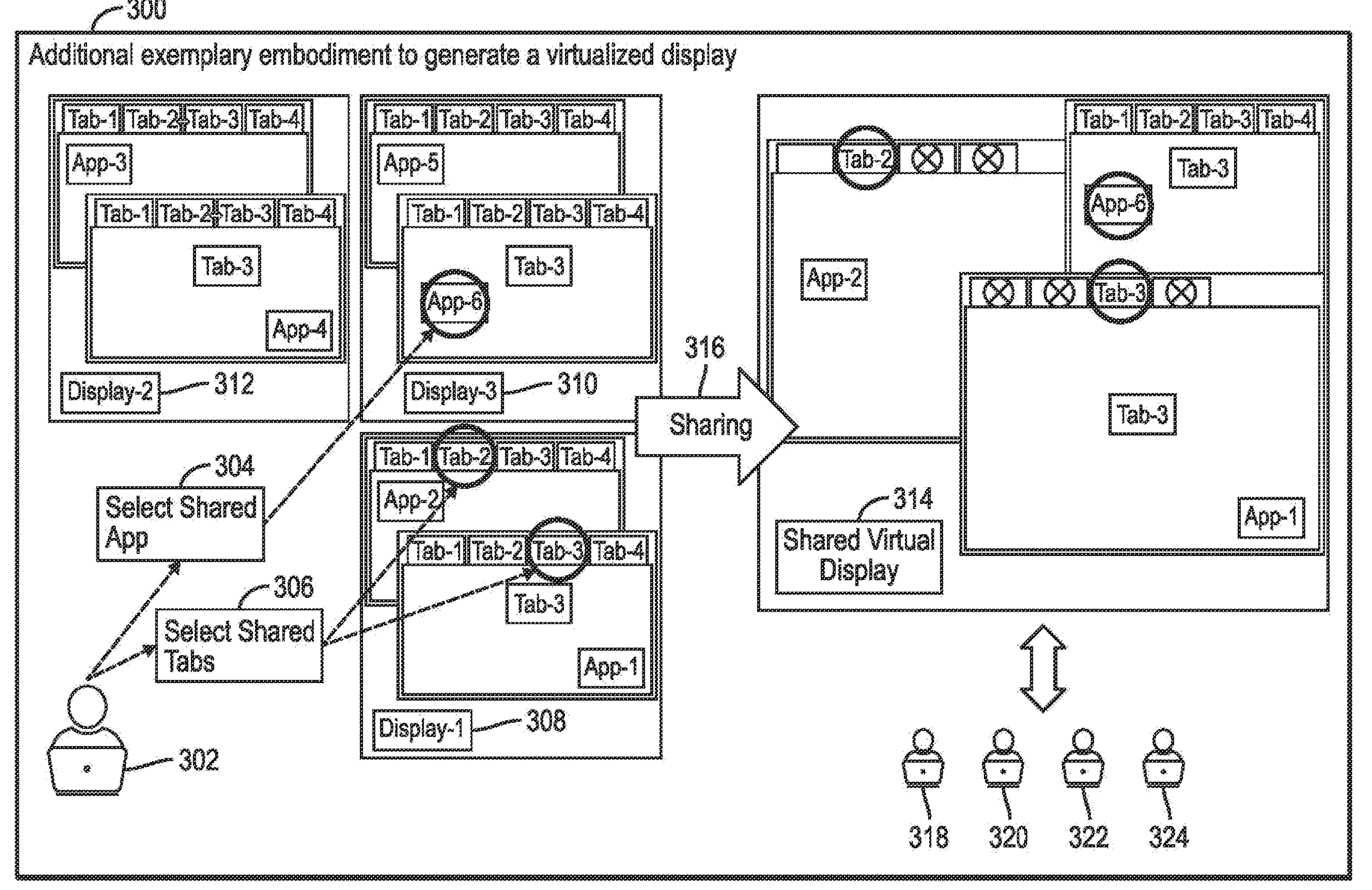
FIG. 3 illustrates a block diagram that shows an additional exemplary embodiment to generate a virtualized display, in accordance with certain embodiments.

FIG. 3 illustrates a block diagram 300 that shows an additional exemplary embodiment to generate a virtualized display, in accordance with certain embodiments.

A user 302 selects shared applications and shared tabs (shown via reference numerals 304, 306) from three display screens 308, 310, 312, where each display screen has multiple applications running on them with multiple tabs. The user selects one or more applications and a tab from each of them for sharing on the virtualized display 314 (as shown via reference numeral 316). It can be seen that only a selected set of applications and tabs are shared by the user 302 for the users 318, 320, 322, 324 via the virtualized display 314. The virtualized display 314 is transmitted to the remote computational devices 104 for sharing with the users 318, 320, 322, 324.

Therefore, FIGS. 2 and 3 illustrate certain embodiments in which a first object is displayed on a first display monitor, wherein a second object is displayed on a second display monitor. The first object displayed on the first display monitor and the second object displayed on the second display monitor are mapped to a virtualized display. The first object displayed on the first display monitor and the second object displayed on the second display monitor are shared within the virtualized screen sharing management application 106 via the virtualized display 108.

Figure 4:
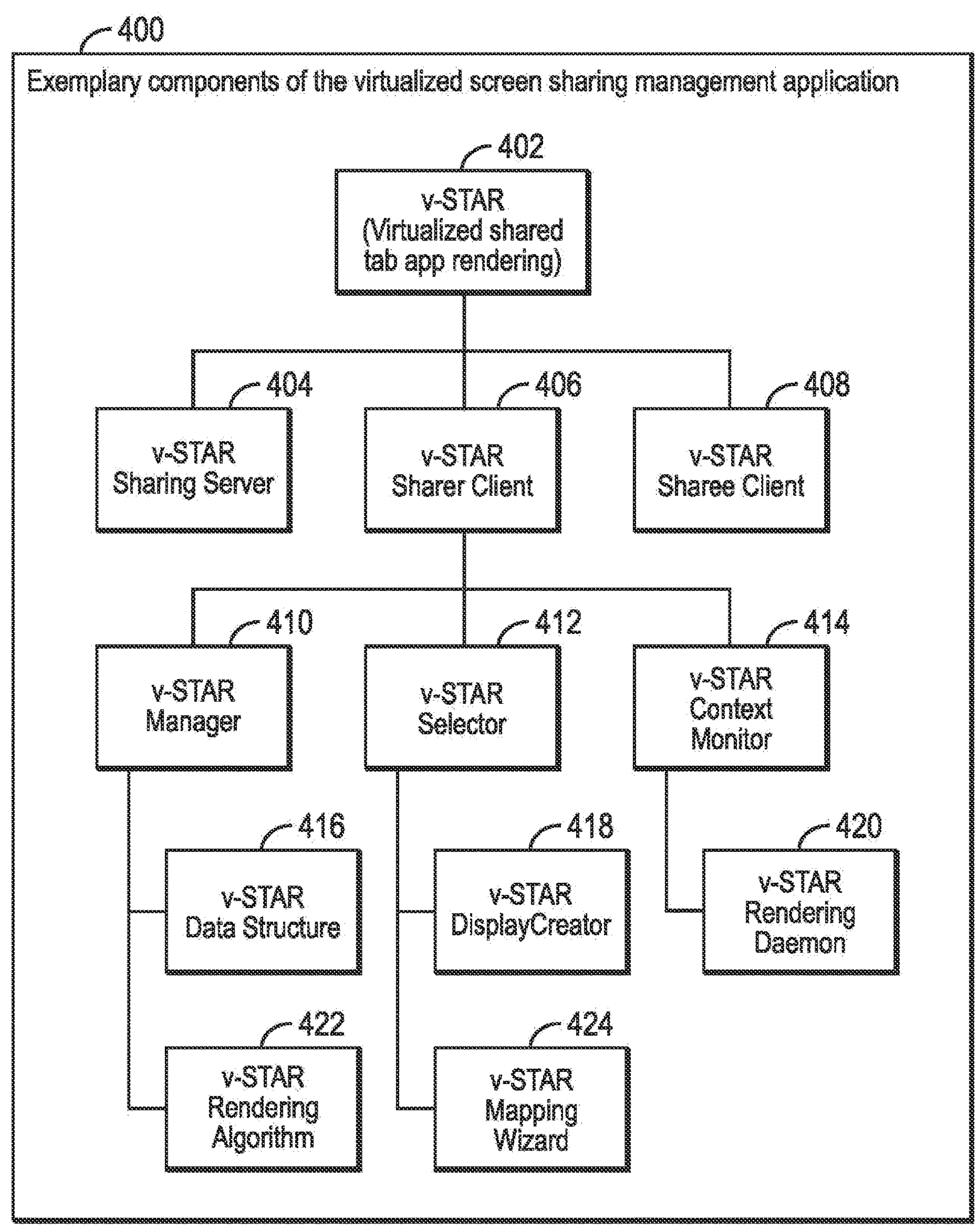
FIG. 4 illustrates a block diagram that shows exemplary components of the virtualized screen sharing management application, in accordance with certain embodiments.

FIG. 4 illustrates a block diagram 400 that shows exemplary components of the virtualized screen sharing management application 106, in accordance with certain embodiments.

Certain embodiments define a Virtualized Shared Tab-App Rendering [v-STAR 402] for mapping user selected tabs and applications in a new created virtualized display. Mechanisms are provided for defining a framework for supporting Virtualized Shared tab and application rendering via a v-STAR sharing server 404, a v-STAR sharer client 406 and a v-STAR sharee Client 408.

A v-STAR data structure 416 is defined for handling selected applications in a shared environment. Exemplary pseudocode for the v-STAR data structure 416 may include:

```
v-STAR [Display[VirtualDisplayID],
    SharedItem[[OrginalDisplayID],
```

APP[app-i][tab-j],
Coordinations(InOriginalDisplay[xi,yi], InVirtualDisplay[xj,yj]),
CurrentEvent(event)]].

The above pseudocode shows an application programming interface (API) for mapping applications and tabs from an original display to a virtual display and the mapping of the coordinate locations of the original display to the virtual display. Events are also included in the API.

The mechanisms also define an optimized rendering algorithm for handling mapped applications and tabs in a shared environment via a v-STAR Rendering Algorithm 422.

For instance, in certain embodiments the exemplary pseudocode is as follows:

if CurrentEvent(event)=mouseclick(SharedItem[[OrginalDisplayID], APP[app-i][tab-j]]), then
renderFront(Display[VirtualDisplayID],
SharedItem[[OrginalDisplayID],
APP[app-i][tab-j],
Coordinations(InOriginalDisplay[xi,yi], InVirtualDisplay[xj,yj])].

The above pseudocode shows how events such as mouse clicks that chose applications and tabs in an original display are used for rendering a virtual display with the chosen applications and tabs. A module referred to as the v-STAR manager 410 may coordinate various processes in the computational device 102. Other modules of FIG. 4 are described in conjunction with the flowchart described in FIG. 5.

Therefore FIG. 4 shows embodiments in which a sequence of operations are defined for handling objects that are selected to be shared within the virtualized screen sharing management application 106 based on observed events. Events are monitored within the virtualized screen sharing management application 106. An object is rendered for display on the virtualized display 108 according to the sequence of operations in response to observing an event.

Figure 5:
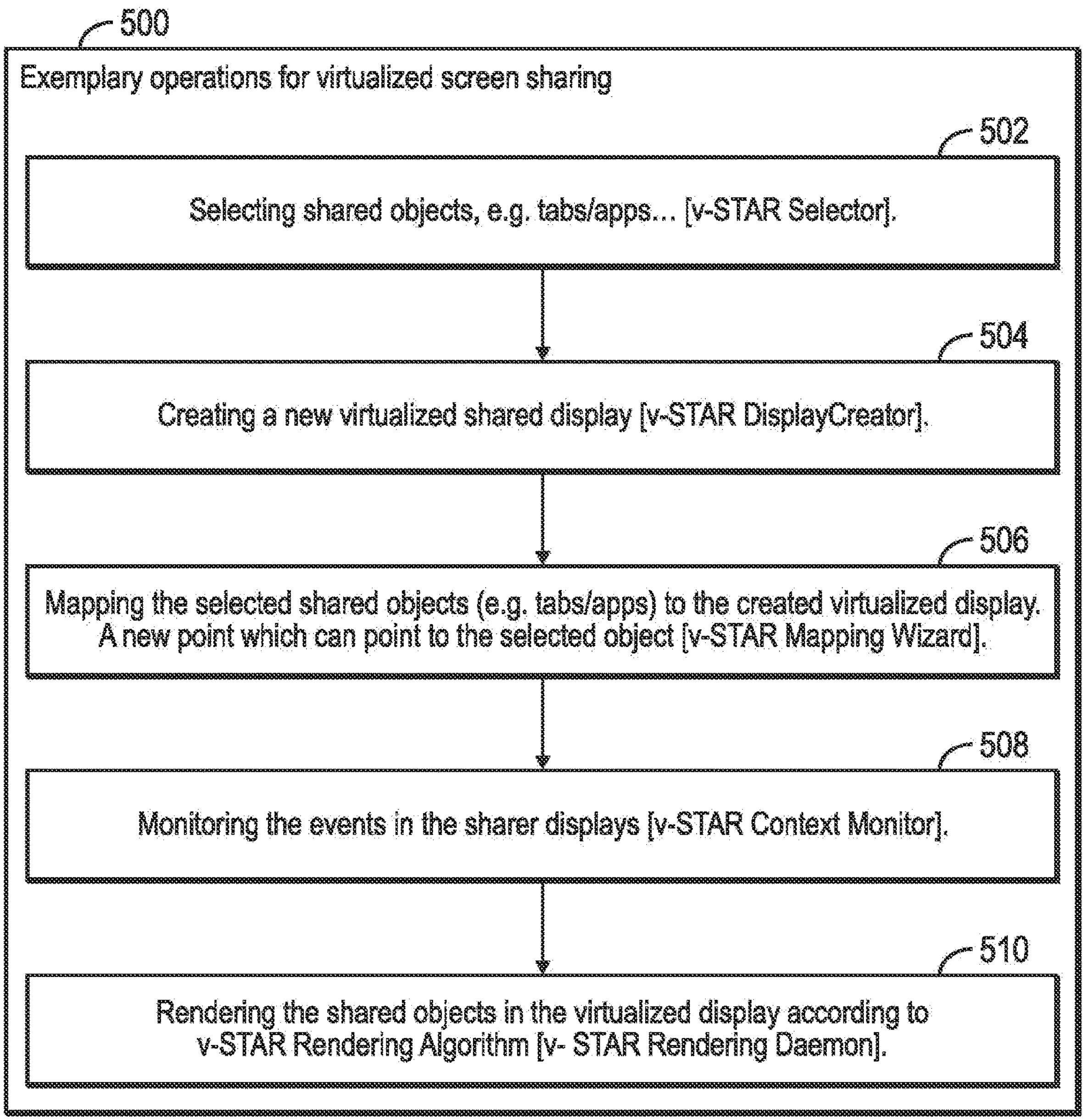
FIG. 5 illustrates a flowchart that shows operations for virtualized screen sharing, in accordance with certain embodiments.

FIG. 5 illustrates a flowchart 500 that shows operations for virtualized screen sharing, in accordance with certain embodiments.

Control starts at block 504 where in response to selecting shared objects (e.g., tabs and applications) by the v-STAR Selector module 412, a new virtualized shared display is created by the v-STAR DisplayCreator module 418.

From block 504 control proceeds to block 506 in which the selected shared objects (e.g., tabs and applications) are mapped to the created virtualized display. A new point (e.g., via a pointer data structure) which can point to the selected object is generated by the v-STAR Mapping Wizard 424.

From block 506 control proceeds to block 508 where a monitoring of the events in the sharer displays is performed by the v-STAR Context Monitor module 414. The events may include mouse clicks, opening or closing of tabs or windows, etc.

From block 508 control proceeds to block 510 in which the shared objects are rendered in the virtualized display according to v-STAR Rendering Algorithm 422 executed by the v-STAR Rendering Daemon 420.

Figure 6:
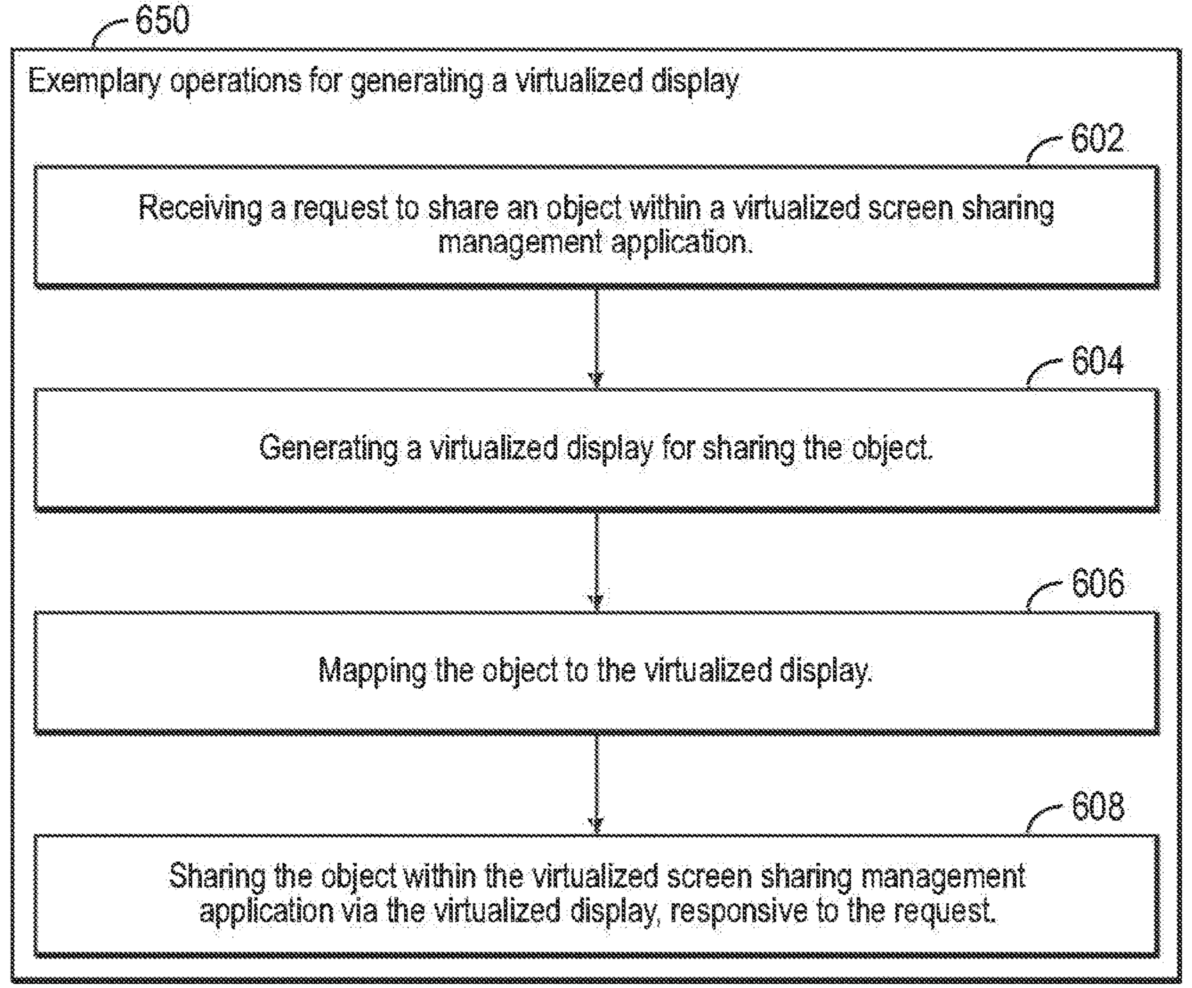
FIG. 6 illustrates a flowchart that shows operations for generating a virtualized display, in accordance with certain embodiments.

FIG. 6 illustrates a flowchart 600 that shows operations for generating a virtualized display, in accordance with certain embodiments.

Control starts at block 602 in which a request to share an object (e.g., any of objects 112, 114) is received within a virtualized screen sharing management application 106. A virtualized display 108 for sharing the object is generated (at block 604). The object is mapped (at block 606) to the virtualized display 108.

From block 606 control proceeds to block 608 in which responsive to the request, the object is shared within the virtualized screen sharing management application 106 via the virtualized display 108.

Therefore, FIGS. 1-6 illustrate certain embodiments for sharing a selected set of applications and tabs via a virtualized display 108 from a local computational device 102 with a remote computational device 104 during web conferencing.

Additional Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code (block 1350) involved in performing the inventive methods, such as the virtualized screen sharing management application 1360 (The virtualized screen sharing management application 1360 of FIG. 13 is shown via reference numeral 106 in FIG. 1).

In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1350, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 1350 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 1350 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares. CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms “a”, “an” and “the” mean “one or more”, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:

receiving a request to share a first tab of a first plurality of tabs of a first object displayed on a first display monitor displaying a first plurality of objects, and a second tab of a second plurality of tabs of a second object displayed on a second display monitor displaying a second plurality of objects within a virtualized screen sharing management application;

generating a virtualized display;

mapping the first tab of the first object displayed on the first display monitor and the second tab of the second object displayed on the second display monitor to the virtualized display; and sharing the first tab of the first object displayed on the first display monitor and the second tab of the second object displayed on the second display monitor within the virtualized screen sharing management application via the virtualized display.

2. The method of claim 1, the method further comprising:

defining a sequence of operations for handling objects that are selected to be shared within the virtualized screen sharing management application, based on observed events;

monitoring events within the virtualized screen sharing management application; and rendering a a third tab of a third plurality of tabs of a third object displayed on a third display monitor displaying a third plurality of objects for display on the virtualized display according to the sequence of operations in response to observing a first event.

3. The method of claim 1, wherein selected tabs of a selected plurality of objects displayed on a plurality of monitors are mapped to the virtualized display.

4. The method of claim 1, wherein the first object comprises a browser.

5. The method of claim 1, wherein the first object comprises an application.

6. The method of claim 1, wherein the virtualized display is generated on a local computational device and wherein the first object is shared with a remote computational device via the virtualized display.

7. A system, comprising:

a memory; and a processor coupled to the memory, wherein the processor performs operations, the operations comprising:

receiving a request to share a first tab of a first plurality of tabs of a first object displayed on a first display monitor displaying a first plurality of objects, and a second tab of a second plurality of tabs of a second object displayed on a second display monitor displaying a second plurality of objects within a virtualized screen sharing management application;

generating a virtualized display;

mapping the first tab of the first object displayed on the first display monitor and the second tab of the second object displayed on the second display monitor to the virtualized display; and sharing the first tab of the first object displayed on the first display monitor and the second tab of the second object displayed on the second display monitor within the virtualized screen sharing management application via the virtualized display.

8. The system of claim 7, the operations further comprising:

defining a sequence of operations for handling objects that are selected to be shared within the virtualized screen sharing management application, based on observed events;

monitoring events within the virtualized screen sharing management application; and rendering a a third tab of a third plurality of tabs of a third object displayed on a third display monitor displaying a third plurality of objects for display on the virtualized display according to the sequence of operations in response to observing a first event.

9. The system of claim 7, wherein selected tabs of a selected plurality of objects displayed on a plurality of monitors are mapped to the virtualized display.

10. The system of claim 7, wherein the first object comprises a browser.

11. The system of claim 7, wherein the first object comprises an application.

12. The system of claim 7, wherein the virtualized display is generated on a local computational device and wherein the first object is shared with a remote computational device via the virtualized display.

13. A computer program product, the computer program product comprising a computer readable storage medium having computer readable program code embodied there-with, the computer readable program code configured to perform operations, the operations comprising:

receiving a request to share a first tab of a first plurality of tabs of a first object displayed on a first display monitor displaying a first plurality of objects, and a second tab of a second plurality of tabs of a second object displayed on a second display monitor displaying a second plurality of objects within a virtualized screen sharing management application;

generating a virtualized display;

mapping the first tab of the first object displayed on the first display monitor and the second tab of the second object displayed on the second display monitor to the virtualized display; and sharing the first tab of the first object displayed on the first display monitor and the second tab of the second object displayed on the second display monitor within the virtualized screen sharing management application via the virtualized display.

14. The computer program product of claim 13, the operations further comprising:

defining a sequence of operations for handling objects that are selected to be shared within the virtualized screen sharing management application, based on observed events;

monitoring events within the virtualized screen sharing management application; and rendering a third tab of a third plurality of tabs of a third object displayed on a third display monitor displaying a third plurality of objects for display on the virtualized display according to the sequence of operations in response to observing a first event.

15. The computer program product of claim 13, wherein selected tabs of a selected plurality of objects displayed on a plurality of monitors are mapped to the virtualized display.

16. The computer program product of claim 13, wherein the first object comprises a browser.

17. The computer program product of claim 13, wherein the first object comprises an application.

18. The computer program product of claim 13, wherein the virtualized display is generated on a local computational device and wherein the first object is shared with a remote computational device via the virtualized display.

* * * * *